(12) United States Patent
Walsh (10) Patent No.: US 8,423,290 B1
(45) Date of Patent: Apr. 16, 2013

(54) METHOD OF PROVIDING EMERGENCY ROUTE GUIDANCE AND RELATED PORTABLE ELECTRONIC DEVICE

(75) Inventor: Geoff Walsh, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 13/434,785

(22) Filed: Mar. 29, 2012

(51) Int. Cl.
*G01C 21/00* (2006.01)
*G08G 1/123* (2006.01)

(52) U.S. Cl.
USPC ..................... 701/423; 340/995.19

(58) Field of Classification Search .......... 701/400–541; 340/988–996
See application file for complete search history.

(56) References Cited

U.S. PATENT DOCUMENTS 5,787,233 A * 7/1998 Akimoto ..................... 706/45
5,867,110 A * 2/1999 Naito et al. .............. 340/286.05
2005/0027571 A1 * 2/2005 Gamarnik et al. ............... 705/4
2007/0106457 A1 * 5/2007 Rosenberg .................... 701/200
2008/0004790 A1 * 1/2008 Ames ........................... 701/117

FOREIGN PATENT DOCUMENTS

JP 2010-197349 * 9/2010

* cited by examiner

*Primary Examiner* — Muhammad Shafi
(74) *Attorney, Agent, or Firm* — Winston Hsu; Scott Margo (57) ABSTRACT

A method of providing emergency route guidance to guide users away from a disaster includes receiving from a user a request for emergency route guidance through a user interface of a portable electronic device. The method further includes determining the current location of the portable electronic device with a position receiving device, presenting a list of possible disaster types to the user through the user interface of the portable electronic device, and receiving a selected disaster type from the user. At least one suggested route is generated for the user to follow using route software of the portable electronic device according to the selected disaster type and the current location of the portable electronic device. Navigation instructions are then provided for guiding the user on the suggested route in order to avoid the selected disaster type.

9 Claims, 7 Drawing Sheets

FIG. 1

Emergency Route Guidance

Please Select Disaster Type :

52— Tsunami
54— Flood
56— Earthquake
58— Volcano
60— Hurricane
62— Tornado

Or Select a Radius to Maintain From Current Location :

FIG. 7

METHOD OF PROVIDING EMERGENCY ROUTE GUIDANCE AND RELATED PORTABLE ELECTRONIC DEVICE

BACKGROUND OF THE INVENTION

1. Field of the Invention

The invention relates to providing emergency route guidance to guide users away from a disaster, and more particularly, to using a portable electronic device to provide navigation instructions away from a disaster when the user requests emergency route guidance from the portable electronic device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices strive to guide users on the best possible route in order to minimize the time needed to travel from one point to another. However, in the event of a disaster occurring near the user, the user may be less concerned about arriving at a particular destination, and may be more concerned about simply getting away from the user's current location.

Recent natural disasters around the globe highlight the possible need for users to be able to receive guidance to a safe area. How to get to a safe area might be known for some local residents. Unfortunately, tourists visiting an unfamiliar city or country cannot easily benefit from the knowledge of the local residents. In the past, confusion among drivers has even caused drivers to drive their vehicles straight toward a disaster, such as a tsunami or flood, instead of driving away from it. For tourists not very familiar with their current location, finding an appropriate destination to use for escaping a disaster would be very difficult.

Even for those users having a navigation device, choosing an escape route is not always a simple matter in the case of a disaster. This is because there is not usually a given destination that the user must enter into the navigation device. Instead, the user often is trying to get away from the user's current location. In other words, the navigation device needs to guide the user away from a given location, which is the opposite of the navigation device's typical job of guiding the user to a destination. Therefore, there exists a need for a navigation device which can provide emergency route guidance in order to guide users away from a disaster.

SUMMARY OF THE INVENTION

It is therefore one of the primary objectives of the claimed invention to disclose a method of providing emergency route guidance to guide users away from a disaster, and a related portable electronic device.

According to an exemplary embodiment of the claimed invention, a method of providing emergency route guidance to guide users away from a disaster is disclosed. The method includes receiving from a user a request for emergency route guidance through a user interface of a portable electronic device, the portable electronic device including a map database for storing map data including road information, route software for creating navigation instructions for generated routes, and a position receiving device receiving position signals indicating a current location of the portable electronic device. The method further includes determining the current location of the portable electronic device with the position receiving device, presenting a list of possible disaster types to the user through the user interface of the portable electronic device, and receiving a selected disaster type from the user. At least one suggested route is generated for the user to follow using the route software of the portable electronic device according to the selected disaster type and the current location of the portable electronic device. Navigation instructions are then provided for guiding the user on the suggested route in order to avoid the selected disaster type.

According to another exemplary embodiment of the claimed invention, a portable electronic device for providing emergency route guidance to guide users away from a disaster is disclosed. The portable electronic device includes a position receiving device receiving position signals indicating a current location of the portable electronic device and a map database for storing map data including road information. A user interface receives an emergency route guidance request from a user of the portable electronic device, presents a list of possible disaster types to the user, and receives a selected disaster type from the user. Route software generates at least one suggested route for the user to follow according to the selected disaster type and the current location of the portable electronic device, and provides navigation instructions for guiding the user on the suggested route in order to avoid the selected disaster type.

It is an advantage that the present invention helps guide a user of the portable electronic device to a safe location with customized directions for specific types of disasters. The user does not need to input a specific destination, and can receive guidance to a safe location without the need of detailed knowledge of the area.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates a window in the user interface asking a user to select one or more direction arrows that indicates which direction the user would like to go to.

DETAILED DESCRIPTION

Figure 1:
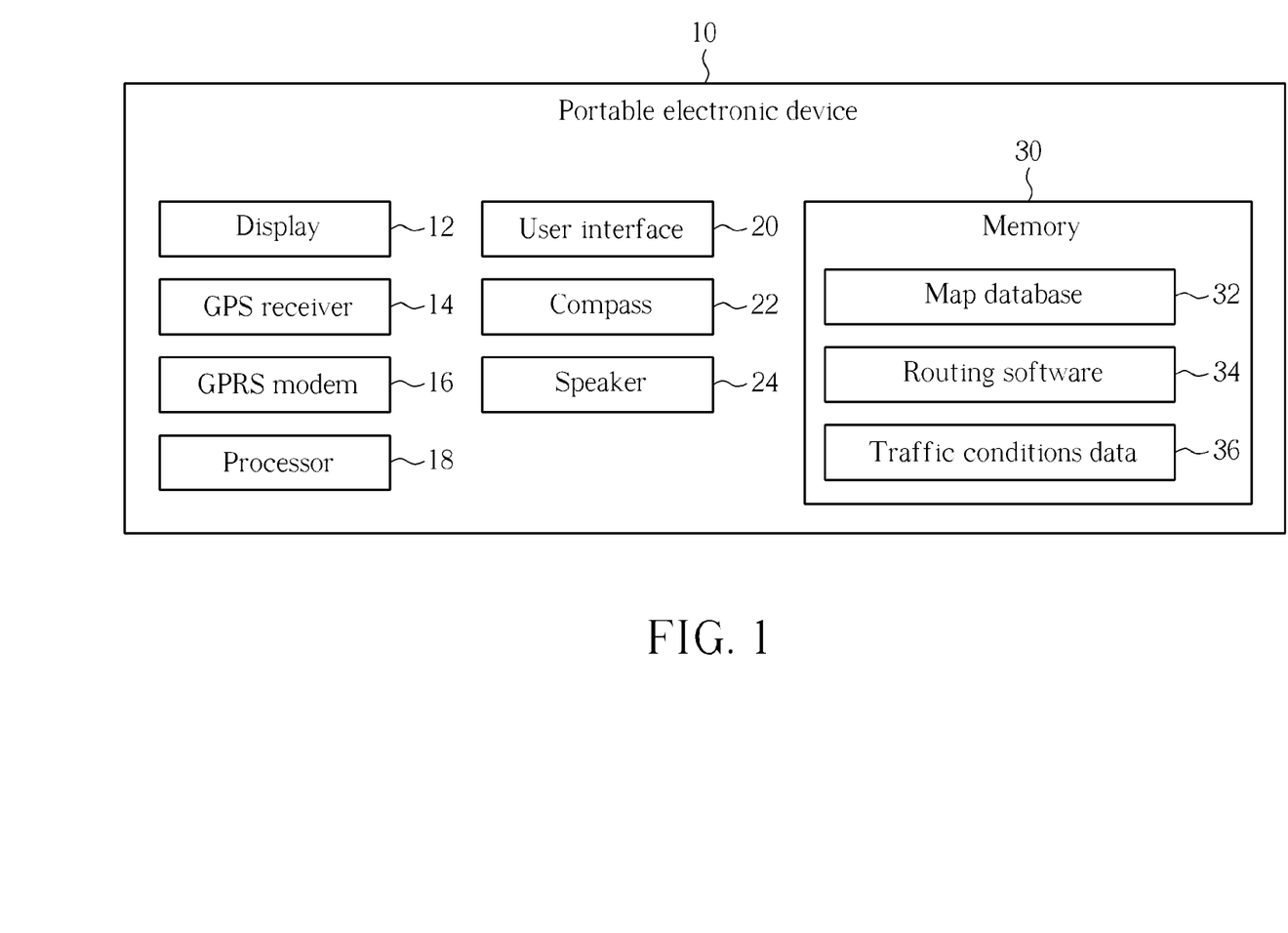
FIG. 1 is a functional block diagram of a portable electronic device according to the present invention.

Please refer to FIG. 1. FIG. 1 is a block diagram of a portable electronic device 10 according to the present invention. The portable electronic device 10 contains a display 12 which can be a touch sensitive display, a GPS receiver 14 for receiving the current coordinates of the portable electronic device 10, a General Packet Radio Service (GPRS) modem 16 or similar device for providing internet access, a processor 18 for controlling operation of the portable electronic device 10, a user interface 20, a compass 22 for determining a direction in which the portable electronic device 10 is oriented, a speaker 24, and a memory 30. The memory 30 is used to store a map database 32 containing map data and elevation data. The memory 30 also stores routing software 34 as well as traffic conditions data 36.

Figure 2:
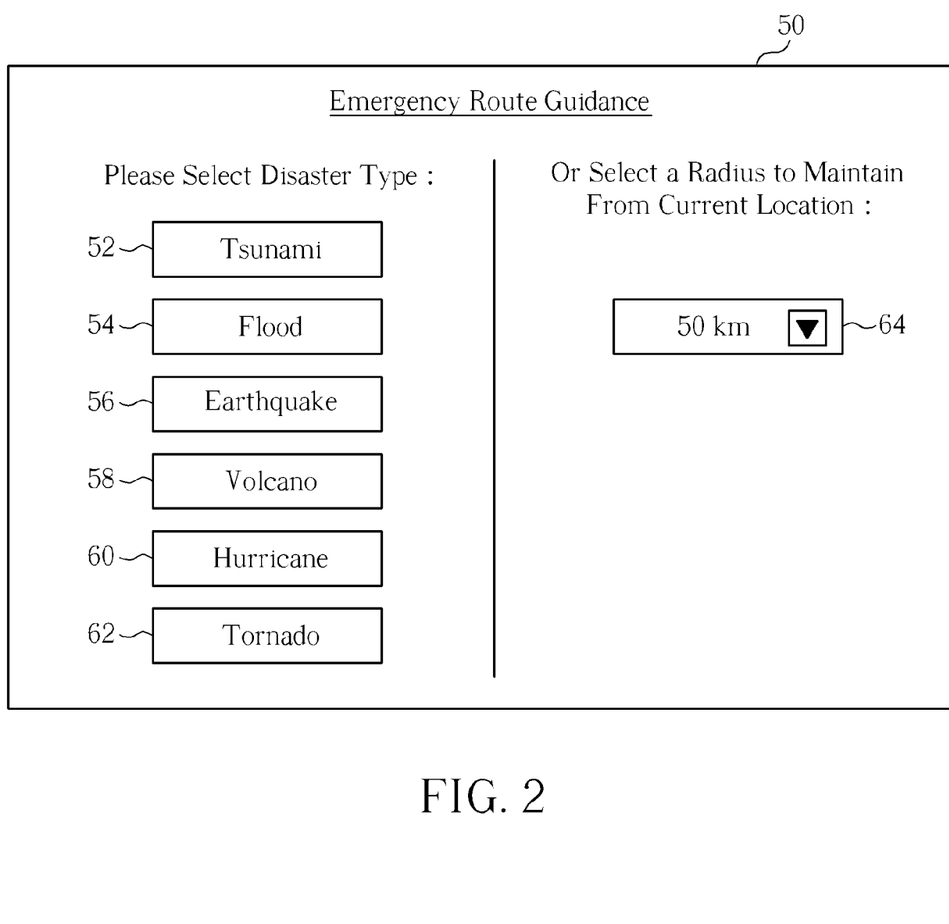
FIG. 2 illustrates a window in the user interface for providing emergency route guidance to the user.

Through the user interface 20, the user of the portable electronic device 10 can request the need for emergency route guidance (ERG). Please refer to FIG. 2. FIG. 2 illustrates a window 50 in the user interface 20 for providing emergency route guidance to the user. The user may have the option to select emergency route guidance according to disaster type or the option to select a radius from the current location of the portable electronic device 10 that the user would like to move away from. For the first option, a list of possible disaster types are presented to the user, including tsunami 52, flood 54, earthquake 56, volcano 58, hurricane 60, or tornado 62. Other disaster types are also possible, and this list of disaster types is not meant to be limiting.

For example, the emergency route guidance may operate according to a few general principles of how to best avoid disasters. For an earthquake or a volcano, generally the safest area is far away from the highest area. For a tsunami or for flooding, the safest area is as far inland as possible, as high as possible, and away from rivers . For a hurricane or tornado, the safest area is located on a tangent, or perpendicular, from a path that the hurricane or tornado is traveling toward. A large building is often another safe area in the event of a hurricane or tornado. By selecting the disaster type from the list of possible disaster types, the portable electronic device 10 is better able to offer suitable emergency route guidance.

Alternatively, if the user does not wish to select from the list of possible disaster types, the user may instead request guidance in getting away from the current location of the portable electronic device 10 by at least a specified radius. As shown in FIG. 2, button 64 shows the radius of 50 kilometers, and the radius can be changed to other distances as well.

In either case, when emergency route guidance is requested, the goal is to guide the user to a safe place as quickly as possible. For routes suggested by the portable electronic device 10, the route should be able to quickly get the user to a safe place. The suggested route should not loop back towards the approaching danger, and should instead steadily move in a direction away from the danger.

The present invention method of providing emergency route guidance in a way strives to do the opposite of what traditional navigation devices accomplish. That is, the emergency route guidance helps guide the user away from a given location, instead of providing navigation instructions to a particular destination entered by the user. Concerning emergency route guidance, the ultimate destination is not as important as simply getting away from the disaster area.

In order to provide the most accurate emergency route guidance, the map database 32 should contain both road information and elevation data since elevation data is critical for avoiding certain types of disasters. Furthermore, the compass 22 is very useful for aligning the direction of the disaster to what the user sees on the display 12 of the portable electronic device 10.

Figure 3:
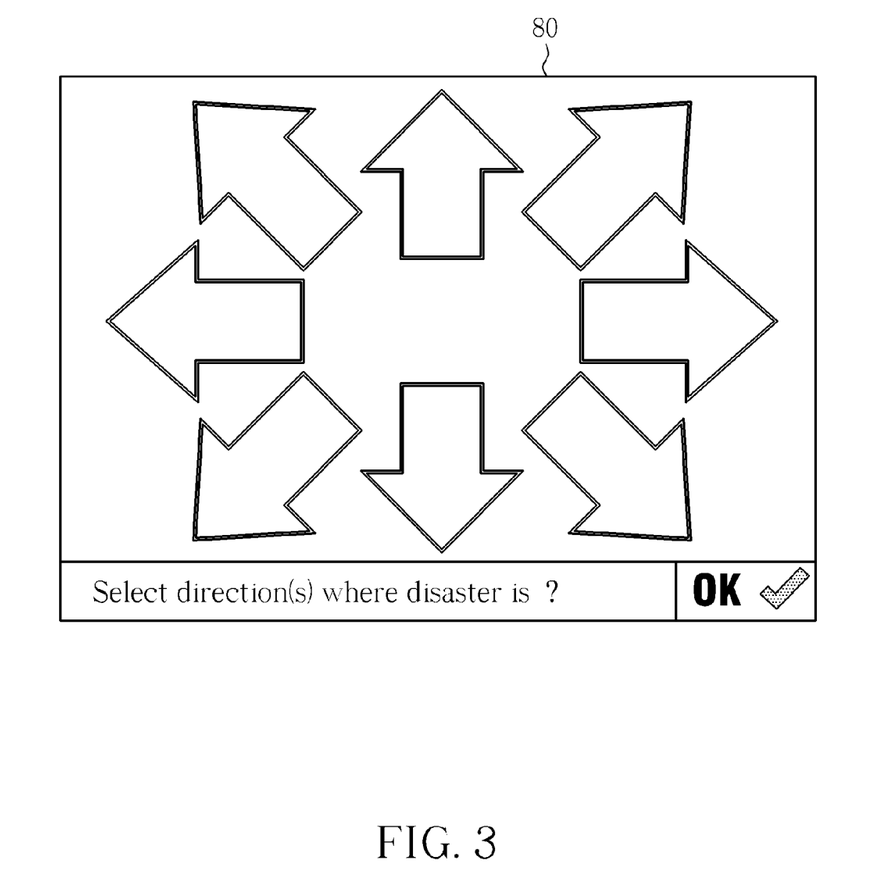
FIG. 3 illustrates a window in the user interface asking a user to select one or more direction arrows that indicates where the disaster is.

Please refer to FIG. 3. FIG. 3 illustrates a window 80 in the user interface 20 asking a user to select one or more direction arrows that indicates where the disaster is. Any number of direction arrows can be provided, although only eight direction arrows are shown in FIG. 3. These eight direction arrows correspond to the four cardinal directions of north, east, south, and west as well as the four ordinal directions of north-east, south-east, south-west, and north-west. Depending on the orientation of the portable electronic device 10, the direction of north may be any one of the eight direction arrows shown in FIG. 3.

Figure 4:
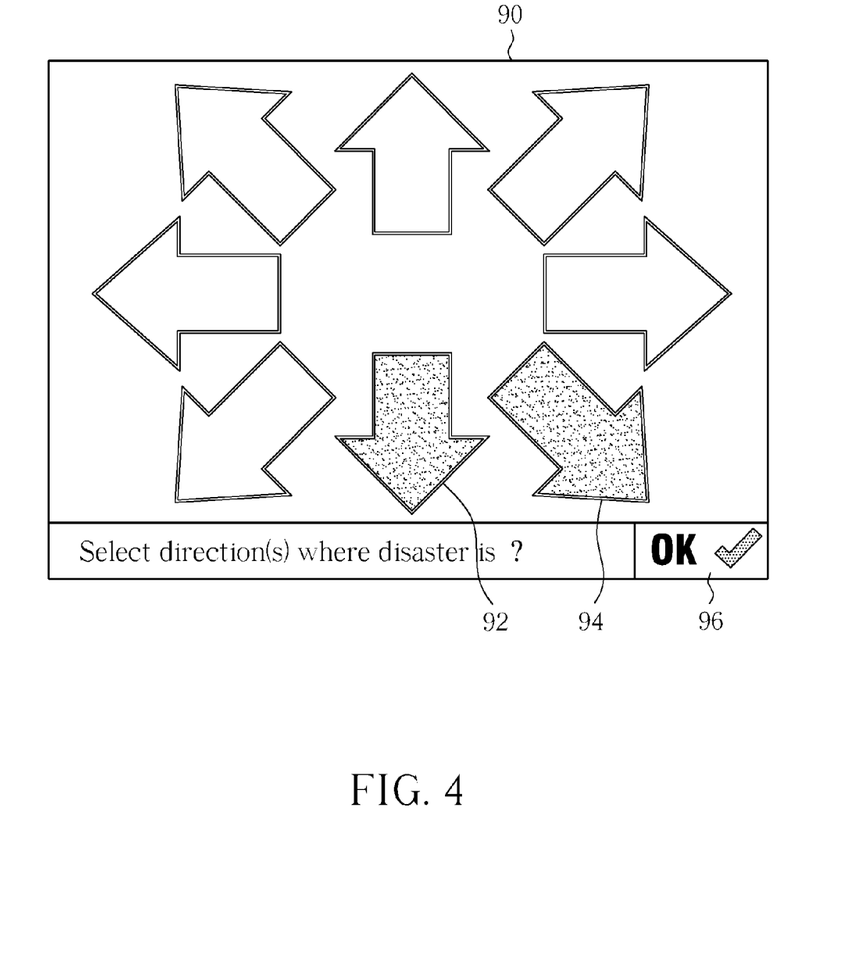
FIG. 4 illustrates a window in the user interface in which the user has already selected direction arrows indicating where the disaster is.

Please refer to FIG. 4. FIG. 4 illustrates a window 90 in the user interface 20 in which the user has already selected direction arrows 92 and 94 indicating where the disaster is. In this case, direction arrows 92 and 94 indicate that the user feels the disaster is located somewhere to the lower direction or lower-right direction of the portable electronic device 10. After the user has made a selection of one or more direction arrows, the user may press the "OK" button 96 (this can also be a button having a label of "confirm", or other similar such label) for confirming the selection.

Figure 5:
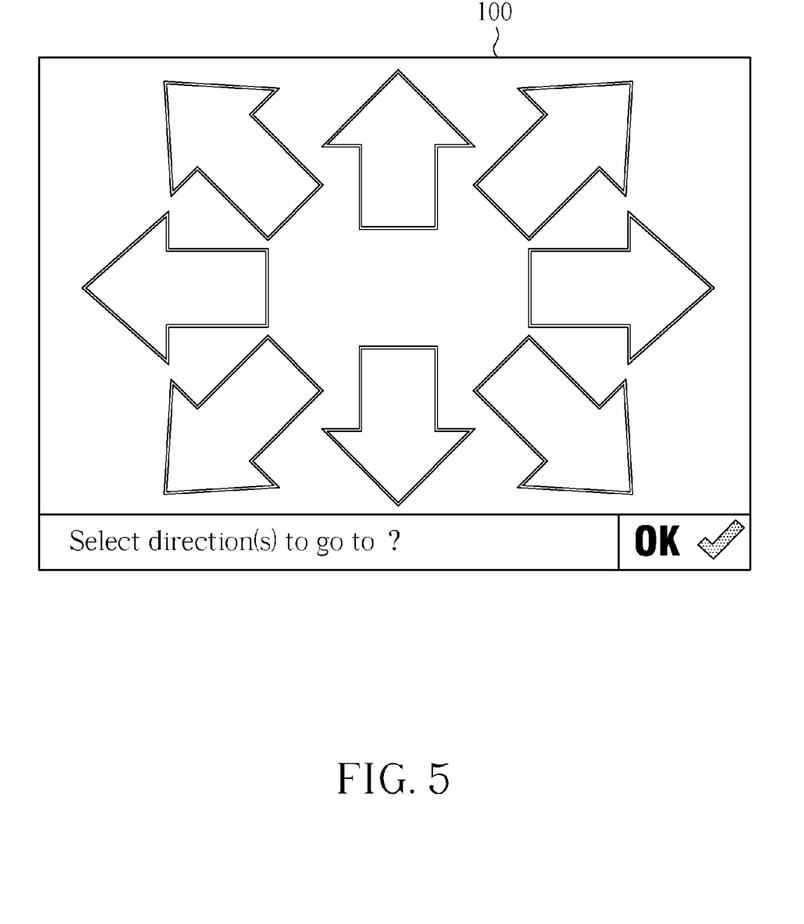

Please refer to FIG. 5. FIG. 5 illustrates a window 100 in the user interface 20 asking a user to select one or more direction arrows that indicates which direction the user would like to go to. FIG. 5 represents an alternate embodiment to what is shown in FIG. 3. In practice, the user can be asked to indicate either the direction where the disaster is, as in FIG. 3, or to indicate which direction the user would like to go to, as in FIG. 5. In either case, the instructions provided should be clear so as to avoid confusing the user and having the user provide the wrong information.

After the user has selected the disaster type and the directions indicating where the disaster is or where the user wishes to go, or alternatively, after the user has specified a radius around the current location that the user would like to avoid, the routing software 34 of the portable electronic device 10 can start generating one or more suggested routes to follow. Factors to be considered when generating the suggested routes are the type of disaster, the geographical directions or the specified radius indicated by the user, the current location of the portable electronic device 10 as indicated by the GPS receiver 14, the elevation data of surrounding areas as indicated in the map database 32, and current traffic information stored in the traffic conditions data 36 section of memory 30. Current traffic information can be downloaded in real-time using an internet connection on the portable electronic device 10, such as through the GPRS modem 16.

If only one suggested route is generated by the routing software 34, then the user can either be immediately presented with the navigation instructions for the generated route or the user can be asked to confirm before the navigation instructions are given. On the other hand, if the routing software 34 generates a plurality of suggested routes, the user can be asked to select among the generated suggested routes.

Figure 6:
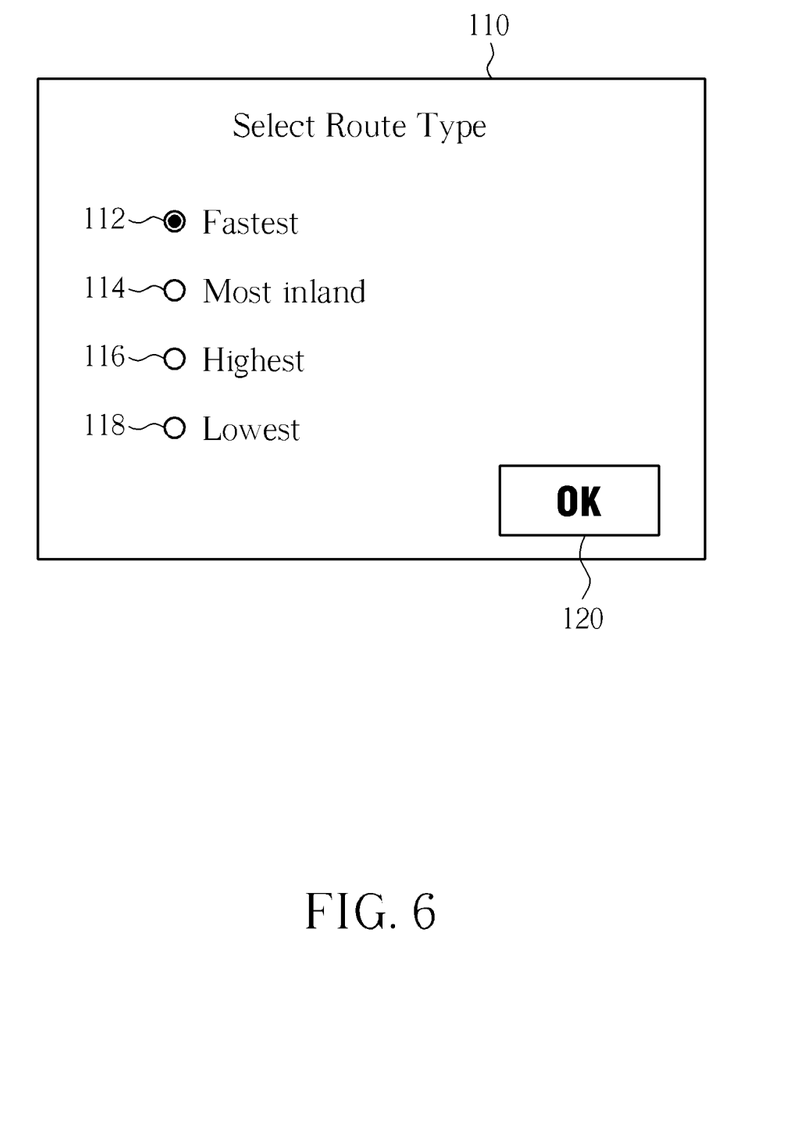
FIG. 6 shows a selection window for enabling a user to select a route type to follow.

Please refer to FIG. 6. FIG. 6 shows a selection window 110 for enabling a user to select a route type to follow. In FIG.

6, route types can be given with descriptive labels for helping the user to quickly decide which type of route to select. The four route types shown in FIG. 6 each have a corresponding radio button 112, 114, 116, and 118 beside the name of the route type for allowing the user to select one of the route types. After the user makes a selection, the user may press the "OK" button 120 (this can also be a button having a label of "confirm", or other similar such label) for confirming the selection.

Please note that besides the route types shown in FIG. 3, the user can also have the opportunity to select among the generated suggested routes in other ways. For instance, each of the suggested routes can be displayed on a map, with the user selecting one of the suggested routes after viewing them. Additionally, during times of a disaster, the fastest route away from a particular location may not always be on the major roads. Country roads that are less traveled on may actually end up being faster during a disaster if fewer people are using them. The routing software 34 can be programmed with this in mind when the user requests emergency route guidance. In many instances, where possible the final destination of suggested routes would not be a fixed location, and the suggested routes would continue indefinitely in order to progress further away from the original location. The routing software 34 of the portable electronic device 10 can be programmed to continue guiding users on the suggested route until no more land is available or until the user cancels or changes the route being followed.

Although the final destination is not a fixed destination, for practical purposes, the portable electronic device 10 will still use one or more temporary destinations for generating the suggested route for the user to follow. Although a single temporary destination may be selected such that the single temporary destination is far away from the current position of the portable electronic device 10, this longer route would require the portable electronic device 10 to spend more time calculating the suggested route. In order to save calculating time in the short term and to allow the user to start traveling a way from the current position as quickly as possible, a series of temporary destinations can be used, with each successive temporary destination being farther away from the current position than the last temporary destination. In this way, the user would be instructed to move a distance away from the current location in the suggested direction. After the user has moved most of that distance, a new temporary destination would be used in order to provide the user with additional instructions for continuing to move away from danger. The temporary destinations can be internally processed by the portable electronic device 10, and the user does not need to be made aware that there even is a temporary destination for the suggested route.

Figure 7:
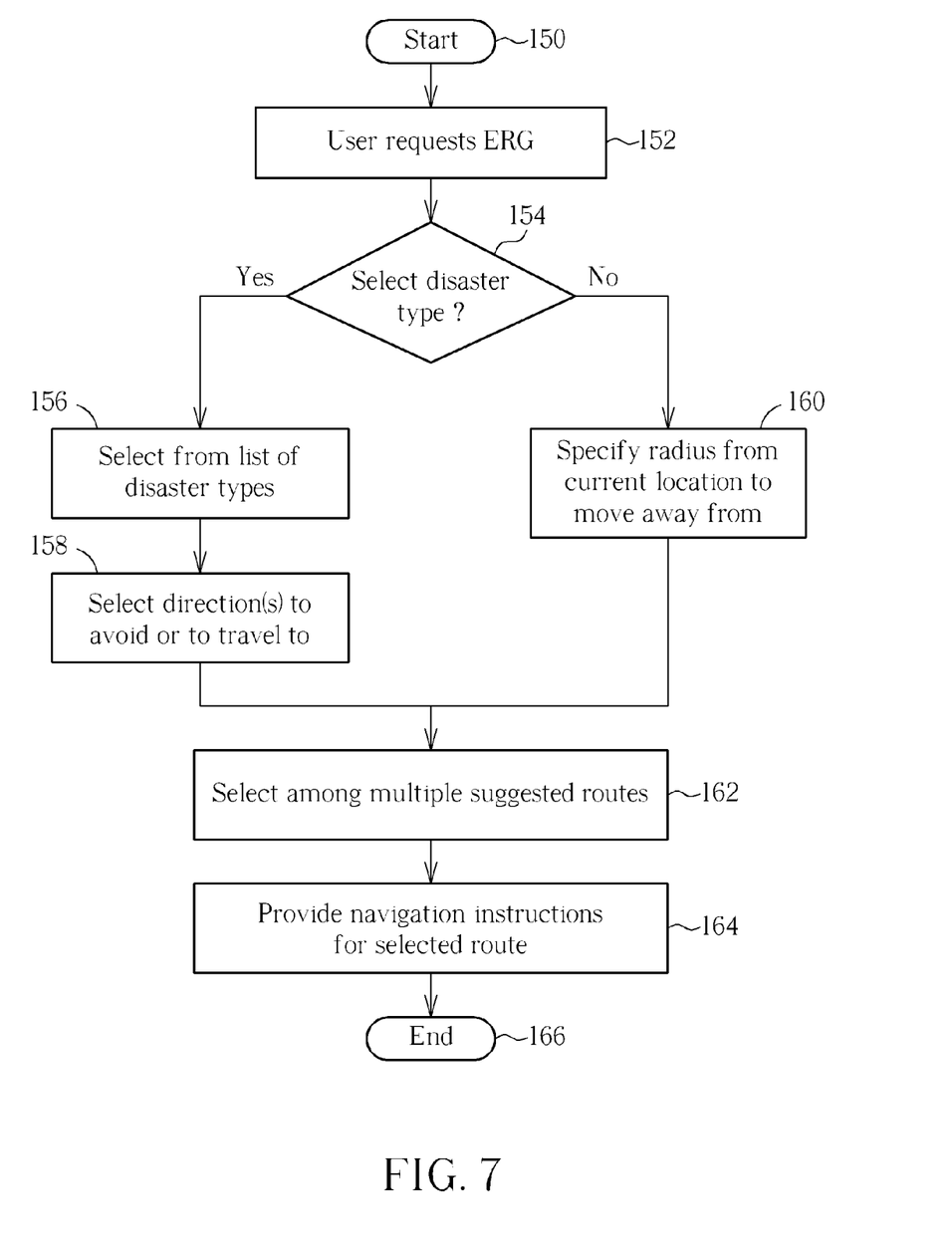
FIG. 7 is a flowchart illustrating the present invention method of providing emergency route guidance to a user of the portable electronic device.

Please refer to FIG. 7. FIG. 7 is a flowchart illustrating the present invention method of providing emergency route guidance to a user of the portable electronic device 10. Steps contained in the flowchart will be explained below.

Step 150: Start.
Step 152: The user requests emergency route guidance using the user interface 20 of the portable electronic device 10.
Step 154: Determine if the user wishes to select from a list of possible disaster types. If so, the flowchart proceeds to step 156. If not, the flowchart proceeds to step 160. As shown in FIG. 2, the user has the option to select emergency route guidance according to disaster type or the option to select a radius from the current location of the portable electronic device 10 that the user would like to move away from.

Step 156: The user selects a disaster type from the list of possible disaster types presented to the user.
Step 158: The user selects one or more direction arrows that indicates where the disaster is or indicates where the user would like to go. The flowchart then proceeds to step 162.
Step 160: The user specifies a radius from the current location of the portable electronic device 10 that the user would like to move away from.
Step 162: The routing software 34 of the portable electronic device 10 presents suggested routes, and the user selects one of the suggested routes.
Step 164: The routing software 34 provides navigation instructions to guide the user along the suggested route selected by the user.
Step 166: End.

The portable electronic device 10 of the present invention may be any device that is capable of providing navigation instructions to a user. For instance, the portable electronic device 10 can be a personal navigation device (PND), a mobile phone, a personal digital assistant (PDA), or other similar devices that have at least a position receiving device such as the GPS receiver 14 and a map database.

The present invention emergency route guidance method offers a simple way to help guide users to a safe location with customized directions for specific types of disasters. The user does not need to input a specific destination, and can quickly receive guidance to a safe location without the need of detailed knowledge of the area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing emergency route guidance to guide users away from a disaster, the method comprising:
receiving from a user a request for emergency route guidance through a user interface of a portable electronic device, the portable electronic device further comprising a map database for storing map data including road information and elevational data, route software for creating navigation instructions for generated routes, and a position receiving device receiving position signals indicating a current location of the portable electronic device;
determining the current location of the portable electronic device with the position receiving device;
presenting a list of possible disaster types to the user through the user interface of the portable electronic device;
receiving a selected disaster type from the user while not receiving any specific destination from the user;
generating, with a processor of the portable electronic device, at least one suggested route for the user to follow by executing the route software of the portable electronic device according to the selected disaster type, and the current location of the portable electronic device, and the elevation data of surrounding areas, wherein locations with higher elevations are avoided when the selected disaster type is an earthquake or a volcano, and locations with lower elevations are avoided when the selected disaster type is a tsunami or flooding, wherein the suggested route does not have a specific destination; and
controlling, with the processor, the user interface to output navigation instructions for guiding the user on the suggested route in order to avoid the selected disaster type.

2. The method of claim 1, wherein the portable electronic device further comprises a compass for determining a direction in which the portable electronic device is oriented, and the method further comprises:
 presenting a plurality of geographical directions to the user through the user interface of the portable electronic device and prompting the user to indicate one or more geographical directions in which the disaster is located; and
 receiving one or more geographical directions selected by the user,
 wherein generating the at least one suggested route for the user to follow using the route software of the portable electronic device is performed according to the selected disaster type, the current location of the portable electronic device, and the one or more selected geographical directions in which the disaster is located.

3. The method of claim 1, wherein the portable electronic device further comprises a compass for determining a direction in which the portable electronic device is oriented, and the method further comprises:
 presenting a plurality of geographical directions to the user through the user interface of the portable electronic device and prompting the user to indicate one or more geographical directions in which the user wishes to travel in order to avoid the disaster; and
 receiving one or more geographical directions selected by the user,
 wherein generating the at least one suggested route for the user to follow using the route software of the portable electronic device is performed according to the selected disaster type, the current location of the portable electronic device, and the one or more selected geographical directions in which the user wishes to travel in order to avoid the disaster.

4. The method of claim 1, wherein generating the at least one suggested route for the user to follow comprises generating a plurality of suggested routes, wherein upon the user selecting one of the plurality of suggested routes, the portable electronic device provides navigation instructions for guiding the user on the selected route in order to avoid the selected disaster type.

5. The method of claim 4, wherein the plurality of suggested routes include routes which are labeled as being a fastest route, a highest route, and a lowest route.

6. The method of claim 1, wherein generating the at least one suggested route for the user to follow using the route software of the portable electronic device is performed according to the selected disaster type, the current location of the portable electronic device, and known current traffic conditions.

7. The method of claim 1, wherein generating the at least one suggested route for the user to follow comprises generating the at least one suggested route while avoiding locations on a path of an approaching hurricane or tornado when the selected disaster type is a hurricane or a tornado.

8. A method of providing emergency route guidance to guide users away from a disaster, the method comprising:
 receiving from a user a request for emergency route guidance through a user interface of a portable electronic device, the portable electronic device further comprising a map database for storing map data including road information and elevation data, route software for creating navigation instructions for generated routes, and a position receiving device receiving position signals indicating a current location of the portable electronic device;
 the user specifying a radius from the current location of the portable electronic device that the user would like to move away from,
 determining the current location of the portable electronic device with the position receiving device; presenting a list of possible disaster types to the user through the user interface of the portable electronic device;
 receiving a selected disaster type from the user;
 generating, with a processor of the portable electronic device, at least one suggested route for the user to follow by executing the route software of the portable electronic device according to the selected disaster type, and the current location of the portable electronic device, and the elevation data of surrounding areas, wherein generating the at least one suggested route for the user to follow comprises generating a route to guide the user away from the current location of the portable electronic device by a distance equal to or greater than the specified radius; radius, wherein locations with higher elevations are avoided when the selected disaster type is an earthquake or a volcano, and locations with lower elevations are avoided when the selected disaster type is a tsunami or flooding; and
 controlling, with the processor, the user interface to output navigation instructions for guiding the user on the suggested route in order to avoid the selected disaster type.

9. A method of providing emergency route guidance to guide users away from a disaster, the method comprising:
 receiving from a user a request for emergency route guidance through a user interface of a portable electronic device, the portable electronic device further comprising a map database for storing map data including road information and elevation data, route software for creating navigation instructions for generated routes, and a position receiving device receiving position signals indicating a current location of the portable electronic device;
 determining the current location of the portable electronic device with the position receiving device;
 presenting a list of possible disaster types to the user through the user interface of the portable electronic device;
 receiving a selected disaster type from the user;
 generating, with a processor of the portable electronic device, at least one suggested route for the user to follow by executing the route software of the portable electronic device according to the selected disaster type, the current location of the portable electronic device, and the elevation data of surrounding areas, wherein when the selected disaster type is a hurricane or tornado the suggested route is substantially parallel to a path that the hurricane or the tornado is traveling toward; and
 controlling, with the processor, the user interface to output navigation instructions for guiding the user on the suggested route in order to avoid the selected disaster type.

* * * * *